(12) United States Patent
Shin

(10) Patent No.: US 11,738,465 B2
(45) Date of Patent: Aug. 29, 2023

(54) ROBOT AND CONTROLLING METHOD THEREOF

(71) Applicant: LG ELECTRONICS INC., Seoul (KR)

(72) Inventor: Yong Kyoung Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1022 days.

(21) Appl. No.: 16/566,966

(22) Filed: Sep. 11, 2019

(65) Prior Publication Data

US 2020/0001465 A1 Jan. 2, 2020

(30) Foreign Application Priority Data

Jul. 31, 2019 (KR) ........................ 10-2019-0093544

(51) Int. Cl.
*B25J 11/00* (2006.01)
*G06N 20/00* (2019.01)
*B25J 9/16* (2006.01)
*B25J 13/08* (2006.01)

(52) U.S. Cl.
CPC ........... *B25J 11/0015* (2013.01); *B25J 9/163* (2013.01); *B25J 11/001* (2013.01); *B25J 13/081* (2013.01); *G06N 20/00* (2019.01)

(58) Field of Classification Search
CPC ...... B25J 11/0015; B25J 9/163; B25J 11/001; B25J 13/081; B25J 11/0005; B25J 9/161; B25J 9/1679; B25J 19/02; G06N 20/00; G06N 3/008; G06N 3/08
See application file for complete search history.

(56) References Cited

U.S. PATENT DOCUMENTS

2019/0105783 A1\* 4/2019 Al Moubayed ...... B25J 11/0015

\* cited by examiner

*Primary Examiner* — Basil T. Jos
(74) *Attorney, Agent, or Firm* — KED & Associates LLP

(57) ABSTRACT

A robot includes a display configured to display a face image indicating a face of the robot, an input unit configured to receive a customizing request for the face of the robot, and a processor configured to acquire customizing data based on the received customizing request, to generate a face design based on the acquired customizing data, and to control the display to display a face image based on the generated face design.

17 Claims, 12 Drawing Sheets

(a)

(b)

(c)

(d)

(a)

(b)

(c)

(d)

ROBOT AND CONTROLLING METHOD THEREOF

CROSS-REFERENCE TO RELATED APPLICATION

This application claims the benefit of Korean Patent Application No. 10-2019-0093544, filed on Jul. 31, 2019, which is hereby incorporated by reference as if fully set forth herein.

BACKGROUND OF THE INVENTION

Field of the Invention

The present invention relates to a robot and a method of controlling the same.

Discussion of the Related Art

A robot may refer to a machine that automatically processes or operates a given task by its own ability, and robots may be broadly classified into various fields such as industrial robots, medical robots, universe robots, or sea floor robots. In accordance with recent trends, communication robots for communication or interaction with the human through voice, gestures, or the like have increased.

The communication robot includes various types of robots such as a guidance robot that is disposed at a specific place to guide various pieces of information to a user or a home robot in homes. The communication robot may include an education robot for teaching or assisting a learner through an interaction with the learner.

The communication robot may provide various contents according to a user request. For example, the communication robot may output content in the form of graphics through a display.

The communication robot may include a component similar to a face of the human or animals in order to make intimacy or familiarity with a user. For example, the communication robot may output a user interface (UI) indicating some components (eyes, nose, or mouth) of the face through a display included in a head unit. The communication robot may adjust some output components of the face to express predetermined emotion.

However, a type of a face design provided by a manufacturer of a communication robot may be limited.

SUMMARY OF THE INVENTION

An object of the present invention is to provide a robot for outputting a face design customized according to user intention.

Another object of the present invention is to provide a robot for outputting various emotion expressions based on a face design customized by a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a robot includes a display configured to display a face image indicating a face of the robot, an input unit configured to receive a customizing request for the face of the robot, and a processor configured to acquire customizing data based on the received customizing request, to generate a face design based on the acquired customizing data, and to control the display to display a face image based on the generated face design.

In some embodiments, the input unit may include a touchscreen, and the processor may display a drawing interface through the display in response to the received customizing request, and may acquire drawing data corresponding to touch input of a user as the customizing data through the displayed drawing interface and the input unit.

The processor may correct the drawing data to generate the face design.

In some embodiments, the processor may generate a plurality of face design candidates by correcting the drawing data, and upon selecting any one among the plurality of generated face design candidates, the processor may generate the selected face design candidate as the face design.

The drawing data may include partial drawing image for each respective at least one face part.

In some embodiments, the processor may recognize a face part of each of the at least one partial drawing image, and may generate the face design from the drawing data based on the recognized face part.

In some embodiments, the processor may recognize a face part of each of the at least one partial drawing image based on at least one of a shape, a size, an absolute position, or a positional relationship of each of the at least one partial drawing image.

In some embodiments, the processor may recognize a face part of each of the at least one partial drawing image from the drawing data through a learning model trained by a learning processor.

In some embodiments, the processor may display a template selection interface configured to select a partial design for each of face parts in response to the received customizing request, may acquire at least one partial design selected according to the displayed template selection interface as the customizing data, and may generate the face design including the at least one partial design.

The processor may acquire a request for selection of any one of a plurality of templates for a first face part, through the input unit, and may set a design of the selected template to a partial design of the first face part.

The processor may acquire a request for selection of any one of a plurality of templates for a second face part, through the input unit, and may set a design of the selected template to a partial design of the second face part.

In some embodiments, the processor may set emotion to be expressed by the robot based on at least one of information, data, a request, or a command, which is acquired at least one of the input unit, a sensing unit including at least one sensor, or a communication unit, and may display the face image thorough the display based on the set emotion.

The processor may generate the face image obtained by correcting at least some of face parts included in the face design, based on the set emotion.

In another aspect, a method of controlling a robot includes receiving a customizing request for a face of the robot, acquiring customizing data based on the received customizing request, generating a face design based on the acquired customizing data, and displaying a face image based on the generated face design.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
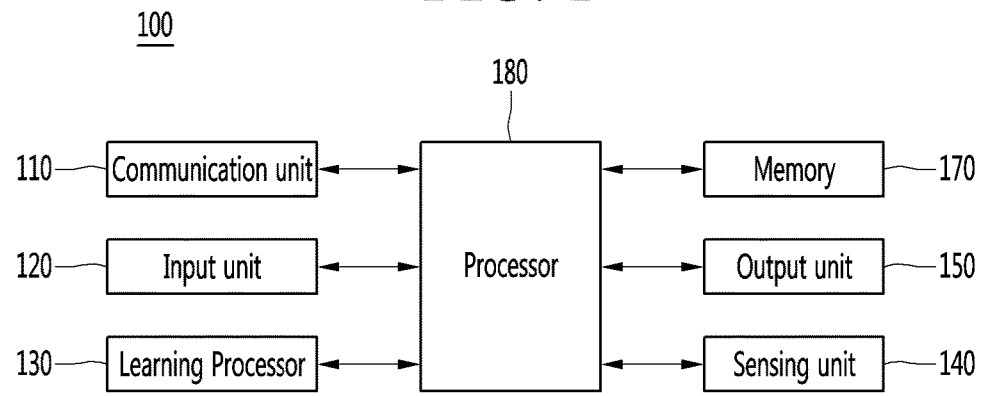
FIG. 1 illustrates an artificial intelligence (AI) device including a robot according to an embodiment of the present invention.

Hereinafter, the present invention will be described in detail by explaining exemplary embodiments of the invention with reference to the attached drawings. The features of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues.

Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with a learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
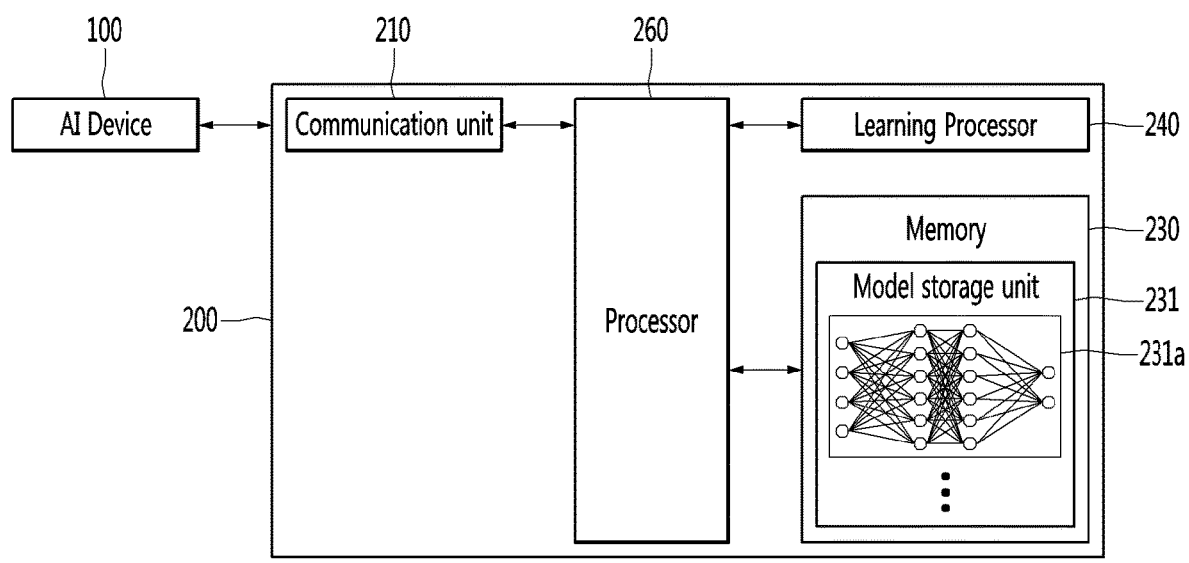
FIG. 2 illustrates an AI server connected to a robot according to an embodiment of the present invention.

FIG. 2 illustrates an AI server 200 connected to a robot according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, the learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
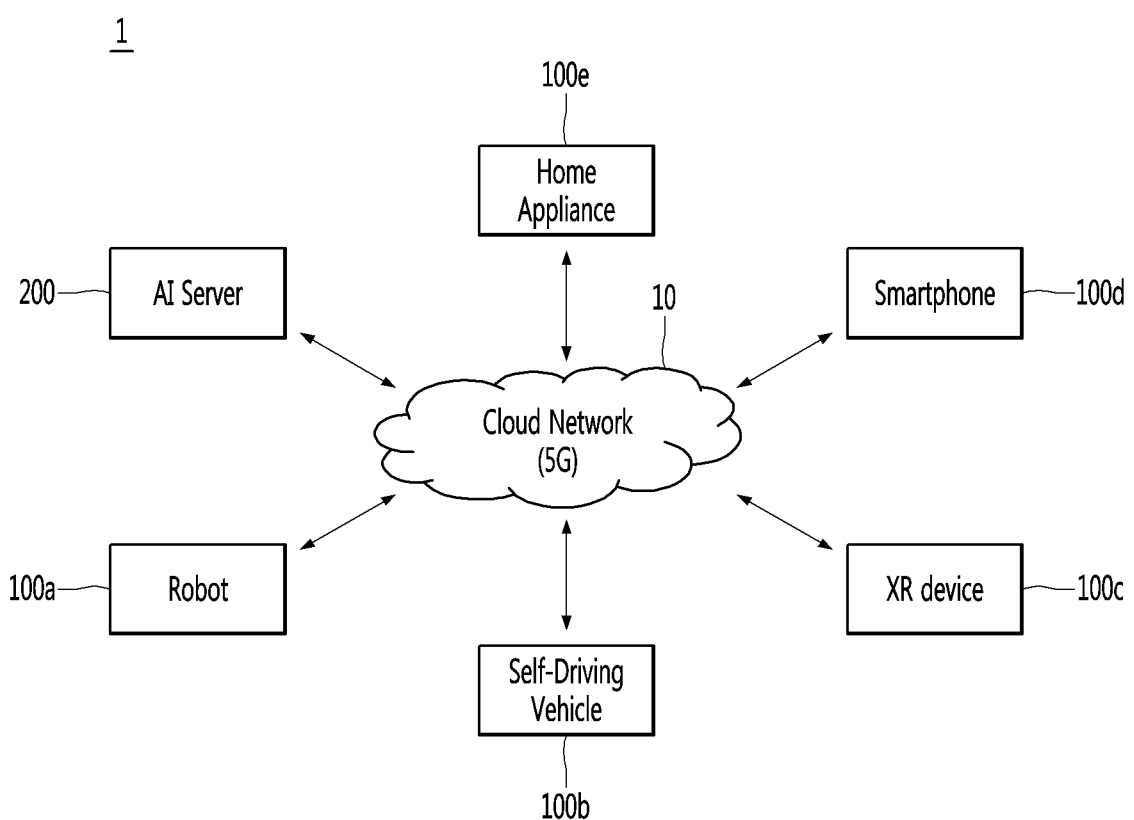
FIG. 3 illustrates an AI system including a robot according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
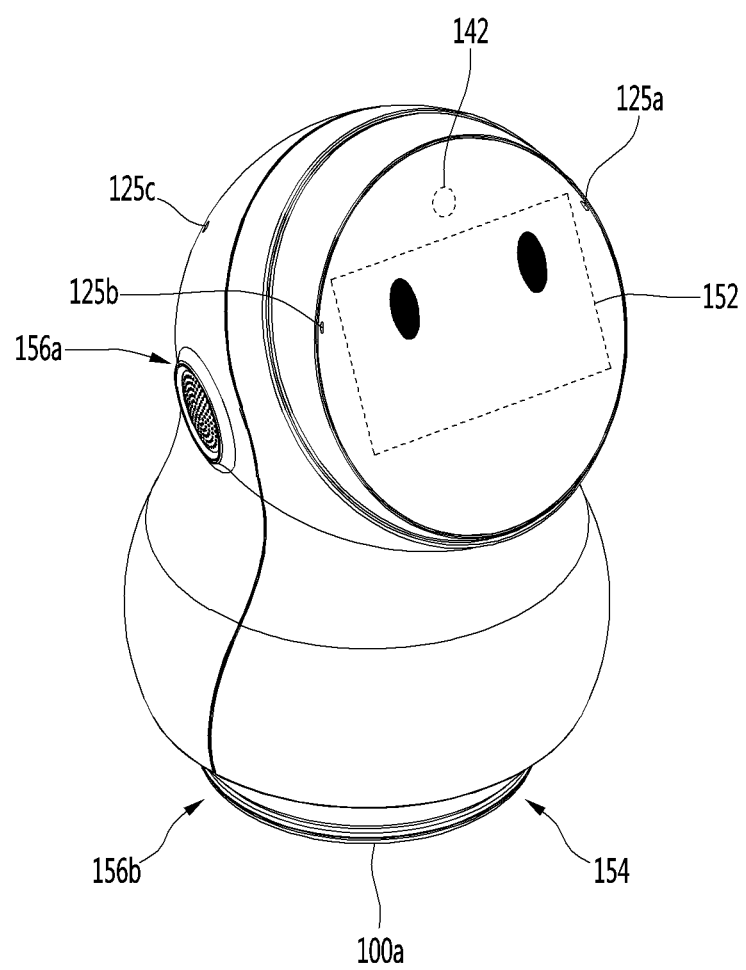
FIG. 4 is a perspective view of a robot according to an embodiment of the present invention.

FIG. 4 is a perspective view of a robot according to an embodiment of the present invention.

Referring to FIG. 4, a robot 100a may correspond to a communication robot for performing an operation of providing information or content or guiding a specific behavior to a user through communication or interaction with the user.

For example, the robot 100a may be a home robot disposed in homes. The home robot may perform an operation of providing various pieces of information or content to a user through an interaction with the user or monitoring an event that occurs in homes.

In order to perform the aforementioned operation, the robot 100a may include input and output devices including a camera 142 for acquiring an image of surrounding of a user or a robot, at least one microphone 124 (refer to FIG. 5) for acquiring user voice, or sound around a robot, a display 152 for outputting graphics or texts, a sound output unit 154 (e.g., a speaker) for outputting voice or sound, and an optical output unit 156 (refer to FIG. 5) for outputting light of color or patterns mapped to a specific event or situation.

The robot 100a may include at least one microphone hole 125a to 125c formed on an external surface of a cover (or a case) in order to smoothly acquire outside sound of a robot through the at least one microphone 124 embodied in the robot 100a. Each of the microphone holes 125a to 125c may be formed at a position corresponding to any one microphone 124, and the microphone 124 may be connected to the outside through the microphone holes 125a to 125c. The robot 100a may include a plurality of microphones that are spaced apart from each other, and in this case, the robot 100a may detect a direction in which sound is generated using the plurality of microphones.

The display 152 may be disposed towards one surface from the robot 100a. Hereinafter, a direction toward which the display 152 is oriented may be defined as a forward direction of the robot 100a. Although the case in which the sound output unit 154 is disposed below the robot 100a is illustrated, a position of the sound output unit 154 may be changed in various forms in some embodiments.

The optical output unit 156 may be embodied as a light source such as a light emitting diode (LED) and may indicate a state, an event, or the like of the robot 100a through change in output patterns. Although FIG. 4 illustrates first optical output units 156a disposed on opposite side surfaces of the robot 100a and a second optical output unit 156b disposed below the robot 100a, the number and arrangement of the optical output units 156 may be changed in various forms.

Although not shown, the robot 100a may further include a moving device (a traveling device) for movement to one position from another position. For example, the moving device may include at least one wheel and a motor for rotating the wheel.

Figure 5:
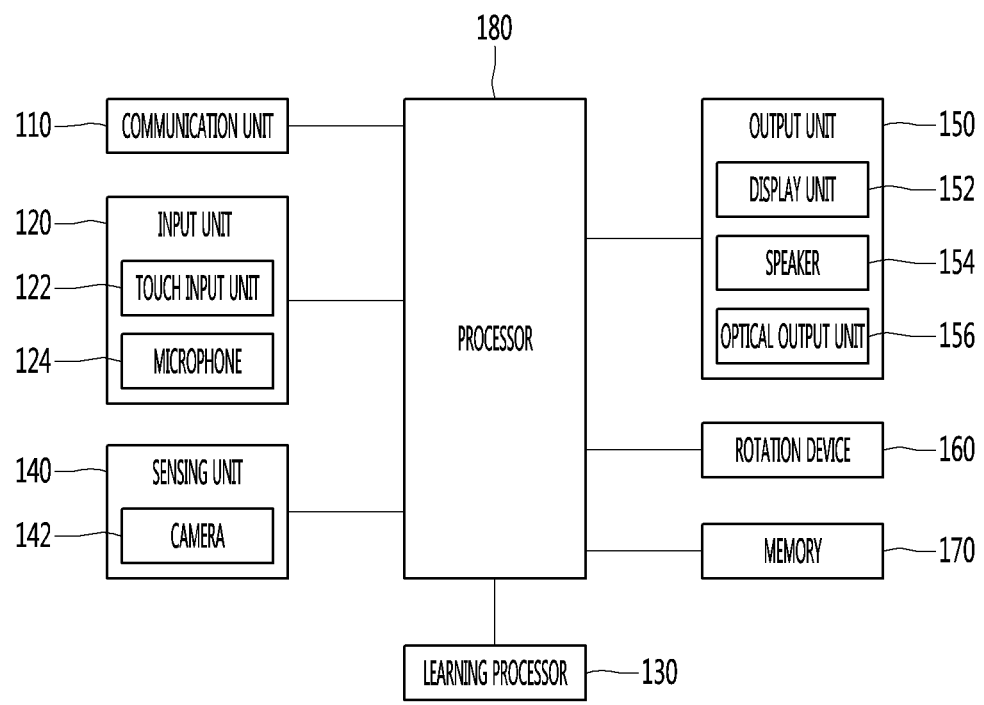
FIG. 5 is a block diagram showing a control configuration of a robot according to an embodiment of the present invention.

FIG. 5 is a block diagram showing a control configuration of a robot according to an embodiment of the present invention.

Referring to FIG. 5, the robot 100a may include a communication unit 110, an input unit 120, a learning processor 130, a sensing unit 140, an output unit 150, a rotation device 160, a memory 170, and a processor 180. The components shown in FIG. 4 are examples for convenience of description, and thus the robot 100a may include greater or fewer components than in FIG. 4.

The description related to the AI device 100 of FIG. 1 may also be applied to the robot 100a according to the present invention, and thus a repetition of the above description of FIG. 1 is omitted.

The communication unit 110 may include communication modules for connecting the robot 100a to a server, a mobile terminal, other robots, or the like through a network. The communication modules may support any one of the communication technologies described above with reference to FIG. 1.

For example, the robot 100a may be connected to a network through an access point such as a router. Accordingly, the robot 100a may provide various pieces of information acquired through the input unit 120, the sensing unit 140, of the like to a server or a mobile terminal through the network. The robot 100a may receive information, data, a command, or the like from the server or the mobile terminal.

The input unit 120 may include at least one input device that acquires various types of data. For example, the at least one input device may include a physical input device such as a button or a dial, a touch input unit 122 such as a touchpad or a touch panel, the microphone 124 for receiving user voice or sound around the robot 100a, or the like. A user may input various requests or commands to the robot 100a through the input unit 120.

The sensing unit 140 may include at least one sensor for sensing various pieces of information of surroundings of the robot 100a. For example, the sensing unit 140 may include the camera 142 and various sensors such as proximity sensor, illumination sensor, touch sensor, and gyro sensor (gyroscope).

The camera 142 may acquire an image of surroundings of the robot 100a. In some embodiments, the processor 180 may acquire an image including a face of a user through the camera 142 or may recognize the user or may acquire a gesture, a face expression, or the like of the user.

The proximity sensor may detect an object such as a user, which approaches the robot 100a. For example, when the proximity sensor detects the user that approaches the same, the processor 180 may output an initial image or initial voice through the output unit 150 and may guide the user to use the robot 100a.

The illumination sensor may detect the brightness of a space in which the robot 100a is disposed. The processor 180 may control components to perform various operations based on the detection result of the illumination sensor and/or information on a time zone.

The touch sensor may detect a part of the human body of the user, which contacts a predetermined region of the robot 100a.

The gyro sensor may a rotation angle, inclination, or the like of the robot 100a. The processor 180 may recognize a direction in which the robot 100a is oriented or shocks from the outside, based on the detection result of the gyro sensor.

The output unit 150 may output various pieces of information or contents related to an operation or state of the robot 100a, various services, programs, or applications executed in the robot 100a, or the like. The output unit 150 may output various messages or information for performing an interaction with a user.

The output unit 150 may include the display 152, a speaker 154, the optical output unit 156, and the like.

The display 152 may output the aforementioned various pieces of information, messages, or contents in the form of graphic. In some embodiments, the display 152 may be embodied in the form of a touchscreen with the touch input unit 122, and in this case, the display 152 may function as an input device as well as an output device.

The speaker 154 may output the various pieces of information, messages, or contents in the form of voice or sound.

The optical output unit 156 may be embodied as a light source such as an LED. The processor 180 may indicate a state or the like of the robot 100a through the optical output unit 156. In some embodiments, the optical output unit 156 may also provide various pieces of information with the display 152 and/or the speaker 154 as an auxiliary output device, to the user.

The rotation device 160 may include a first motor for rotating the robot 100a based on a vertical axis. The processor 180 may control the first motor included in the rotation device 160 to rotate the robot 100a, and thus a direction in which the display 152 and the camera 142 of the robot 100a are oriented may be changed to the left and right directions.

In some embodiments, the rotation device 160 may include a second motor for tilting the robot 100a in forward and backward directions by a predetermined angle. The processor 180 may control the second motor to tilt the robot 100a, and thus may change a direction in which the display 152 and the camera 142 are oriented, to upward and downward directions.

The memory 170 may store various data such as control data for controlling an operation of components included in the robot 100a or data for performing an operation based on input acquired through the input unit 120 or information acquired through the sensing unit 140.

The memory 170 may store program data such as a software module or an application executed by at least one processor or controller included in the processor 180.

The memory 170 may include various storage devices such as ROM, RAM, EPROM, a flash drive, or a hard disk through hardware.

The processor 180 may include at least one processor or controller for controlling an operation of the robot 100a. In detail, the processor 180 may include at least one central processing unit (CPU), an application processor (AP), a microcomputer (or MICOM), an integrated circuit, an application specific integrated circuit (ASIC), or the like.

The robot 100a may include a UI corresponding to a face of a robot through the display 152 included in a head unit in order to make intimacy or familiarity with a user. The processor 180 may control the display 152 to display a face expression corresponding to emotion related to information, input, a command, or the like acquired through the input unit 120, the sensing unit 140, or the like.

However, conventionally, the robot 100a outputs only a face UI that is pre-designed by a manufacturer or the like, and thus a type of a face design provided by the robot 100a may be limited.

Figure 6:
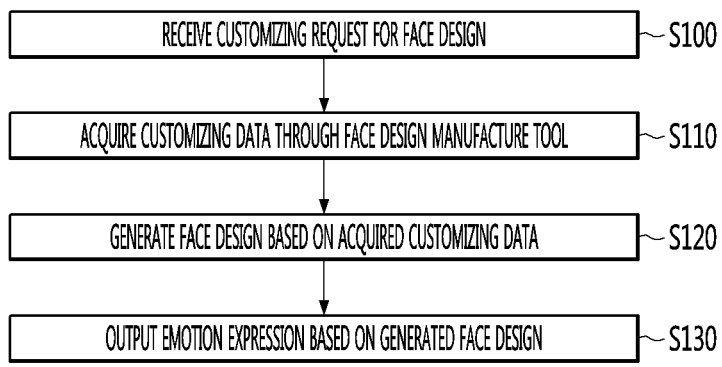
FIG. 6 is a flowchart for explanation of a control operation of a robot according to an embodiment of the present invention.

FIG. 6 is a flowchart for explanation of a control operation of a robot according to an embodiment of the present invention.

Referring to FIG. 6, the robot 100a may receive a customizing request of a face design from a user or the like (S100).

The user may intend to change a design of a face UI displayed through the display 152 of the robot 100a to a customized design.

For example, the processor 180 may receive input corresponding to the customizing request from the user through the input unit 120.

The processor 180 may also receive the customizing request from a user terminal, a server, or the like through the communication unit 110.

In response to the received customizing request, the robot 100a may acquire customizing data related to the face design to be changed, through a face design manufacture tool (S110).

For example, the face design manufacture tool may include a drawing tool and/or a template selection tool.

The drawing tool may be provided in the form of a drawing interface output through the display 152. The processor 180 may acquire drawing data according to touch input of the user with respect to the output drawing interface.

In this case, the customizing data may correspond to drawing data.

In order to acquire the drawing data through the drawing interface, the display 152 may be embodied in the form of a touchscreen coupled to the touch input unit 122. An embodiment related to an operation of acquiring the drawing data will be described below in more detail with reference to FIGS. 7 to 13.

The template selection tool may provide a plurality of templates with respect to face parts and may enable a user to select templates corresponding to a desired face design.

For example, the template selection tool may be provided in the form of a template selection interface output through the display 152. The processor 180 may acquire at least one partial design configuring a face design, based on selection input of a user based on the output template selection interface.

The partial design may correspond to a computer graphic image of a specific face part.

In this case, the customizing data may correspond to at least one selected partial design.

An embodiment related to an operation of acquiring the partial design will be described below in more detail with reference to FIGS. 14 to 17.

The robot 100a may generate a face design based on the acquired customizing data (S120) and may output a face image that indicates emotion expression, based on the generated face design (S130).

The processor 180 may generate various types of face designs according to the acquired customizing data. The face design may be a type of a computer graphic image and may be an image generated by the processor 180.

The processor 180 may indicate various emotion expressions of the robot 100a using the generated face design.

For example, the processor 180 may set emotion corresponding to information, data, a request, and/or a command, which are acquired through the input unit 120 or the sensing unit 140, and may output a face image having face expression corresponding to the set emotion, through the display 152.

In this case, the face image may be an image obtained by coupling or applying an application element corresponding to the emotion to the generated face design.

Figure 7:
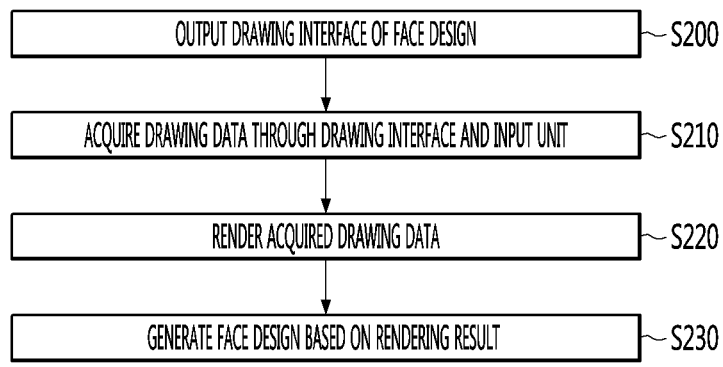
FIG. 7 is a flowchart showing an embodiment related to an operation of generating a face design of the robot illustrated in FIG. 6.

FIG. 7 is a flowchart showing an embodiment related to an operation of generating a face design of the robot illustrated in FIG. 6.

Referring to FIG. 7, the robot 100a may output a drawing interface of a face design in response to the customizing request (S200). The robot 100a may acquire drawing data through the drawing interface and the input unit 120 (S210).

The processor 180 may receive touch input of the user through the output drawing interface. For example, the user may draw a desired face design through the display 152 embodied as a touchscreen to perform the touch input operation.

The processor 180 may acquire drawing data corresponding to touch input of the user. For example, the drawing data may include a partial drawing image indicating each of at least one face part.

The robot 100a may render the acquired drawing data (S220) and may generate a face design based on the rendering result (S230).

The processor 180 may perform rendering on the drawing data to generate a face design.

A partial drawing image included in the drawing data may be obtained by performing drawing by a user through a touchscreen and may need to be corrected in terms of quality as in the case lines are not smooth or sizes or shapes are not irregular. Accordingly, the processor 180 may generate a face design that is visually excellent through rendering of the drawing data.

In detail, the processor 180 may generate the face design through graphic processing (color, shadow, or borderline correction) of each partial drawing image based on a feature point of each partial drawing image in the drawing data.

In some embodiments, the processor 180 may generate a plurality of face design candidates by performing different types of rendering procedures on the drawing data. As a user selects any one of the plurality of face design candidates, the processor 180 may generate the face design.

In some embodiments, the processor 180 may recognize a face part corresponding to each of at least one of partial drawing image included in the acquired drawing data. For example, the processor 180 may recognize a face part corresponding to each partial drawing image based on a shape, a size, an absolute position, a positional relationship, or the like of each partial drawing image.

The processor 180 may also recognize a face part corresponding to each partial drawing image using a learning model trained by the learning processor 130 or the learning processor 240 of the AI server 200.

For example, the processor 180 may input the drawing data acquired through the drawing interface, as the learning model. The processor 180 may acquire the recognition result of each face part included in the drawing data from the learning model, and thus may recognize at least one face part included in the drawing data.

The processor 180 may perform rendering on the drawing data based on the drawing data and the face part recognition result to generate a face design.

FIGS. 8 to 13 are diagrams showing an example related to the embodiment of FIG. 7.

Figure 8:
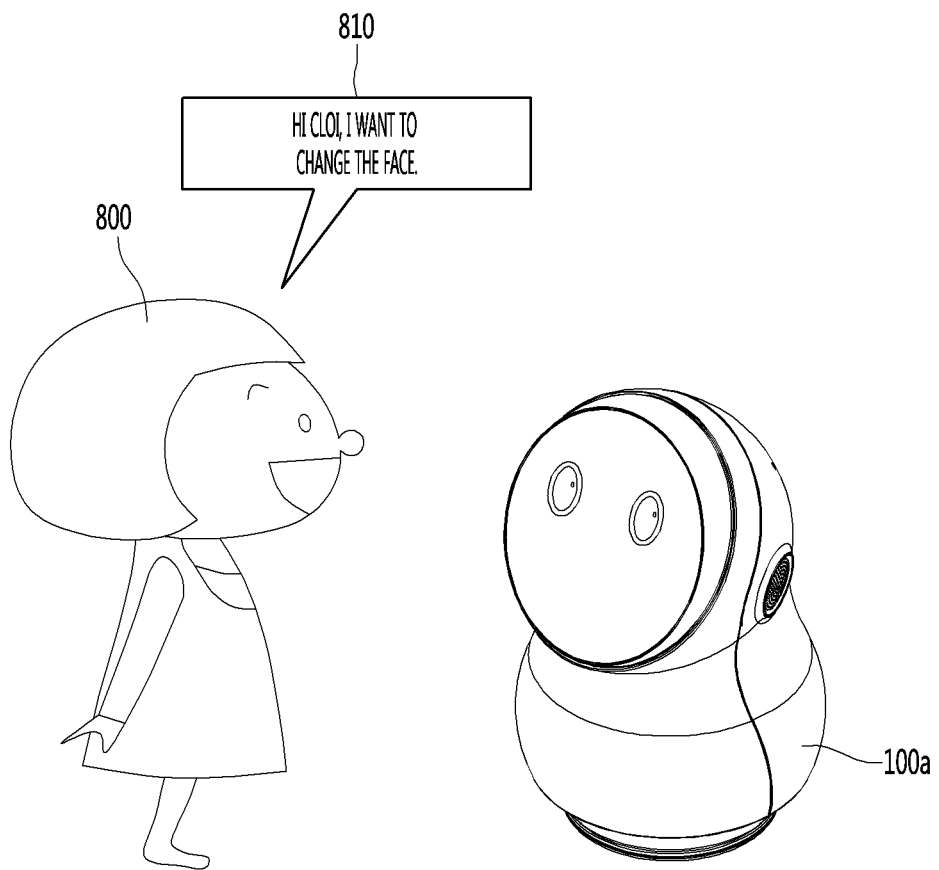
FIGS. 8 to 13 are diagrams showing an example related to the embodiment of FIG. 7.

Referring to FIG. 8, the robot 100a may receive a customizing request of a face design from a user 800.

For example, the user 800 may make an utterance a voice 810 corresponding to the customizing request and the processor 180 may acquire the voice 810 through the microphone 124.

The processor 180 may recognize the acquired voice 810 to acquire the customizing request. Alternatively, the processor 180 may transmit voice data corresponding to the acquired voice 810 to a voice recognition server (not shown) and may receive the voice recognition result from the voice recognition server (not shown) to acquire the customizing request.

Figure 9:
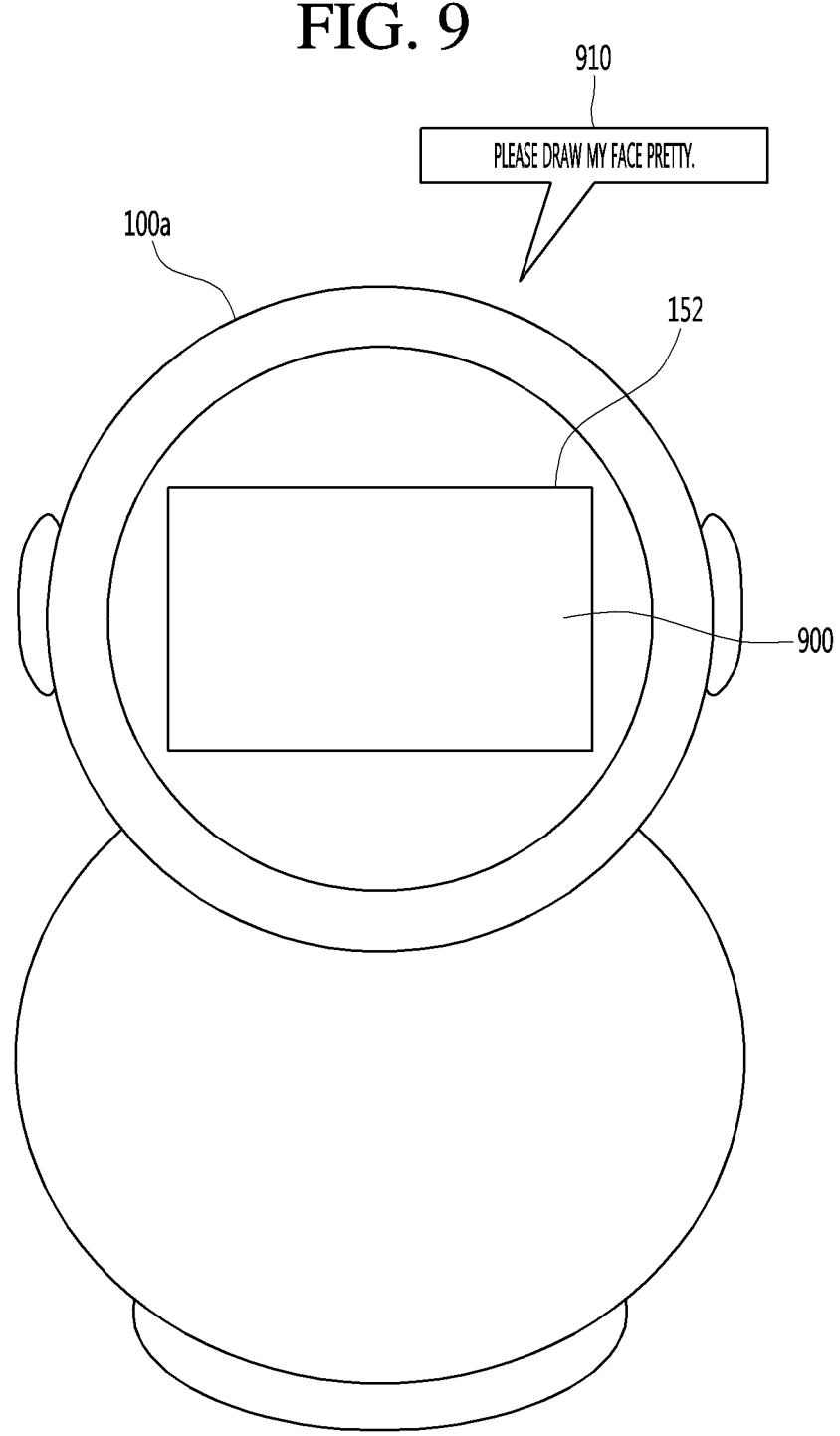

Referring to FIG. 9, the processor 180 may output a drawing interface 900 through the display 152 based on the received customizing request.

In some embodiments, the processor 180 may output a message 910 for guiding the user to perform a drawing operation through the drawing interface 900 in order to acquire drawing data of a face design through the drawing interface 900.

Figure 10:
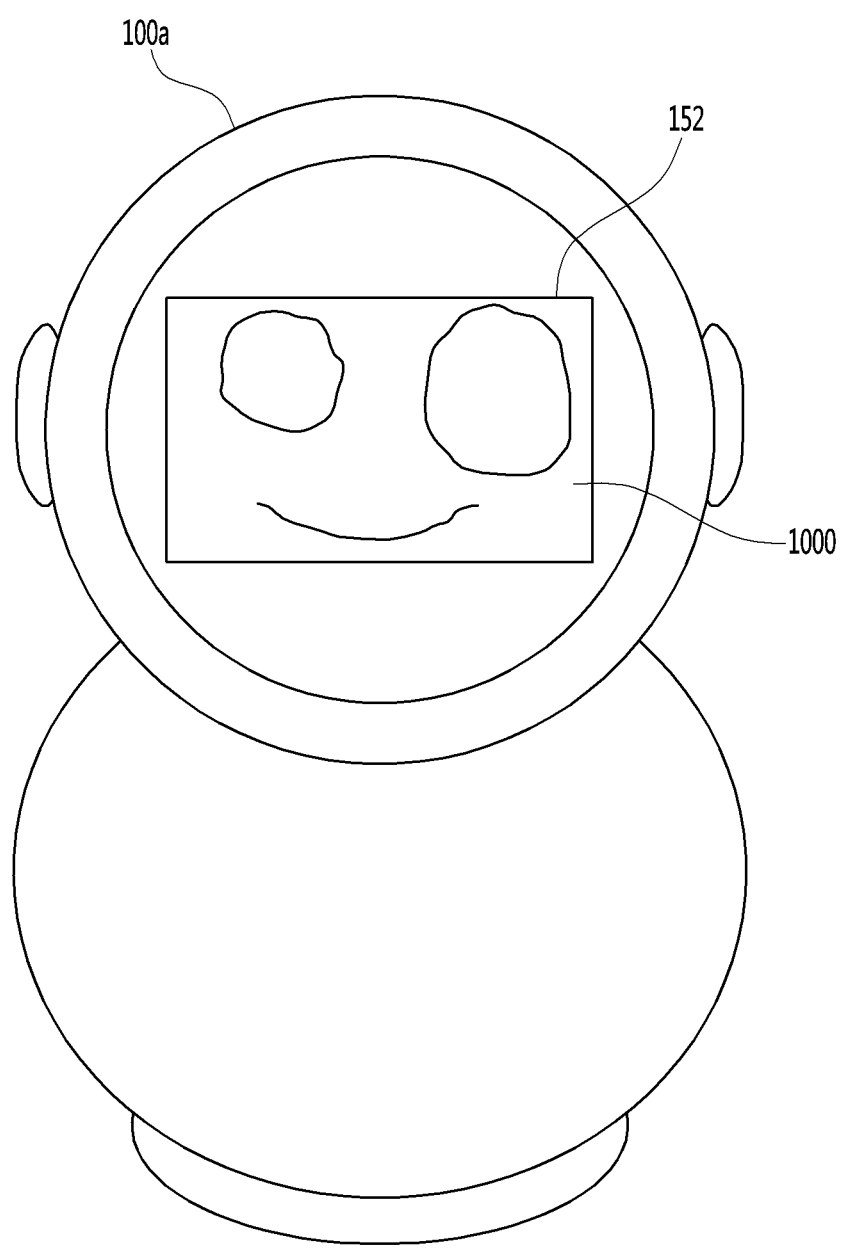
Figure 11:
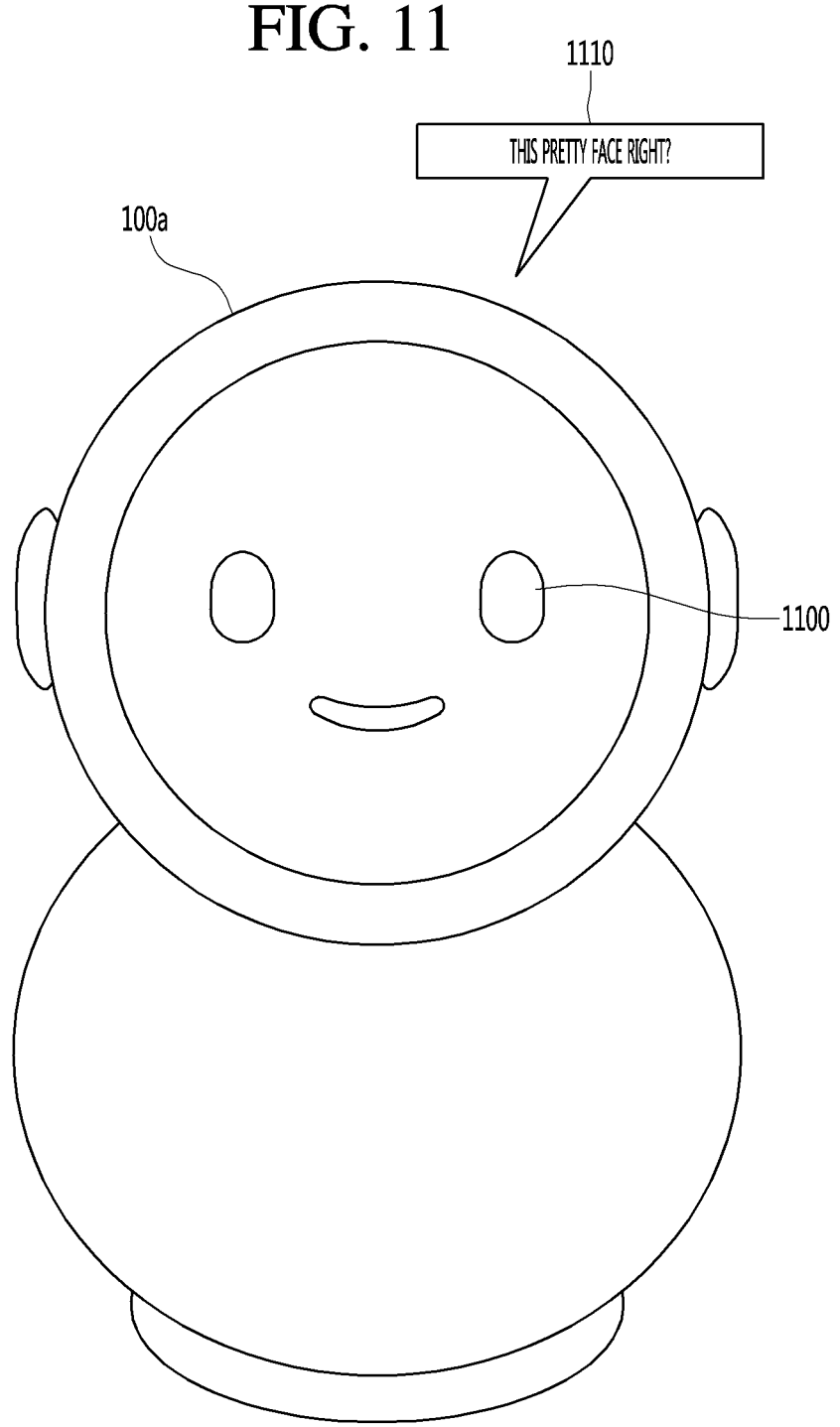
Figure 12:
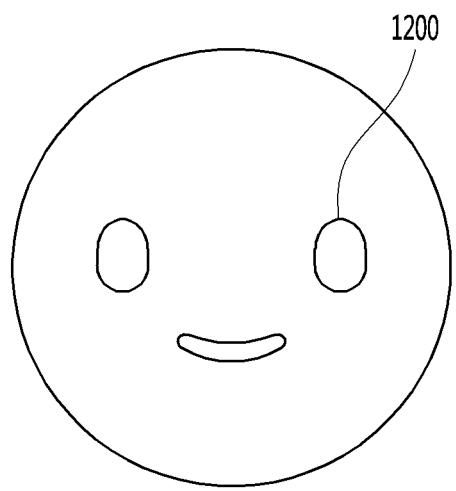
Figure 12:
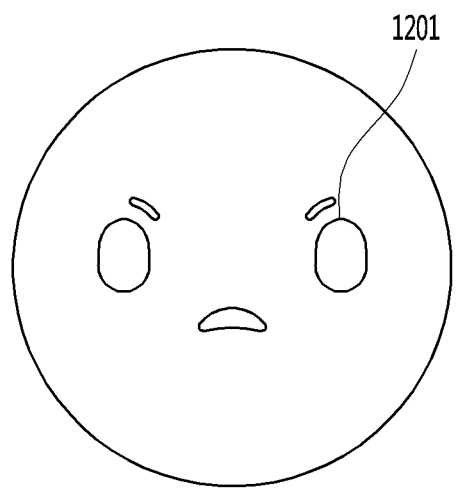
Figure 12:
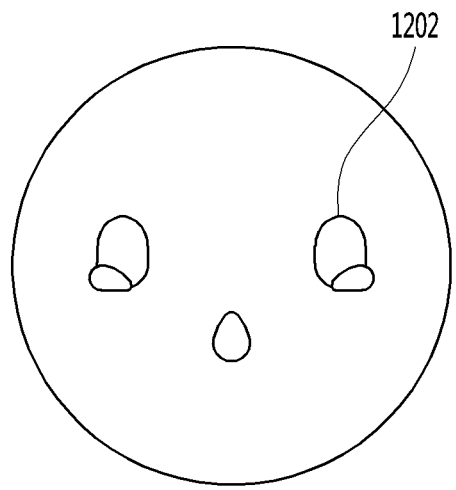
Figure 12:
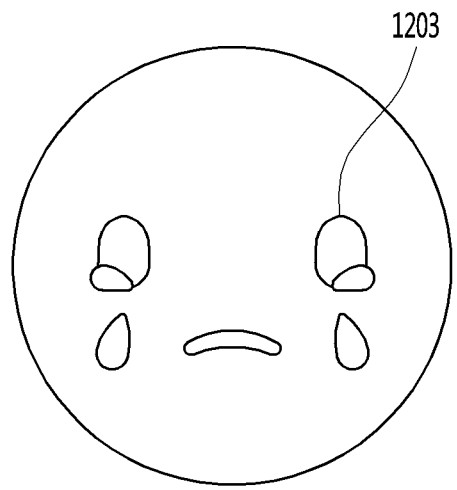

Referring to FIGS. 10 and 11, the user 800 may perform a drawing operation on a face design desired by the user through the drawing interface 900.

For example, the user 800 may perform touch input on the display 152 embodied as a touchscreen to perform a drawing operation.

According to the drawing operation, the processor 180 may acquire drawing data 1000. For example, the drawing data 1000 may include partial drawing images corresponding to two eyes, and a mouth.

The processor 180 may generate a face design 1100 corresponding to the drawing data 1000 by performing rendering on the acquired drawing data 1000.

The processor 180 may correct a size or a borderline of partial drawing images within the acquired drawing data 1000. For example, the processor 180 may correct the sizes of partial drawing images corresponding to eyes in the drawing data 1000 to the same size. The processor 180 may more smoothly correct the borderline of the partial drawing images.

The processor 180 may correct color, shadow, or the like of partial drawing images.

In some embodiments, the processor 180 may recognize a face part corresponding to each of the partial drawing images in the acquired drawing data 1000 and may perform a rendering operation based on the recognition result to generate a face signal that more accurately expresses a face part.

The processor 180 may display the generated face design 1100 through the display 152. As described above, the face design 1100 may be embodied as a graphic image.

In some embodiments, the processor 180 may output a message 1110 that makes a request to a user for checking whether the displayed face design 1100 is applied, through the speaker 154, and may set the face design 1100 to a face design of the robot 100a upon acquiring the user check.

In some embodiments, the processor 180 may generate the plurality of face design candidates of the drawing data 1000. In this case, the processor 180 may display the plurality of generated face design candidates through the display 152 and may also set any one selected by the user among the face design candidates, to the face design of the robot 100a.

Referring to FIGS. 12A to 12D, the robot 100a may provide a face image indicating emotion of the robot 100a based on the set face design.

The processor 180 may set emotion to be expressed by the robot 100a based on information, data, a request, and/or a command, which are acquired through the communication unit 110, the input unit 120, and/or the sensing unit 140.

The processor 180 may correct at least some of face parts included in the face design 1100 or may add application elements, based on a type of the set emotion.

For example, when emotion of the robot 100a is neutral (or default emotion), the processor 180 may display a face image 1200 shown in FIG. 12A.

When emotion of the robot 100a corresponds to surprise, the processor 180 may generate and display a face image 1201 shown in FIG. 12B. For example, the processor 180 may correct a mouth shape from a face image corresponding to neutral emotion and may add an application element corresponding to wrinkle to an upper side of eye to generate the face image 1201 corresponding to surprise.

Similarly, when emotion of the robot 100a is worry, the processor 180 may generate and display a face image 1202 shown in FIG. 12C, and when emotion of the robot 100a is sadness, the processor 180 may generate and display a face image 1203 shown in FIG. 12D.

When drawing data acquired through the drawing interface is data with an abnormal face shape, the robot 100a may generate a face design corresponding to the drawing data. The abnormal face shape may refer to a shape that does not include at least some of face parts (e.g., eyes or mouth) that are not inevitable with regard to emotion expression. For example, drawing data with an abnormal face shape may be a shape with only one eye, a shape without mouth, or the like.

Figure 13:
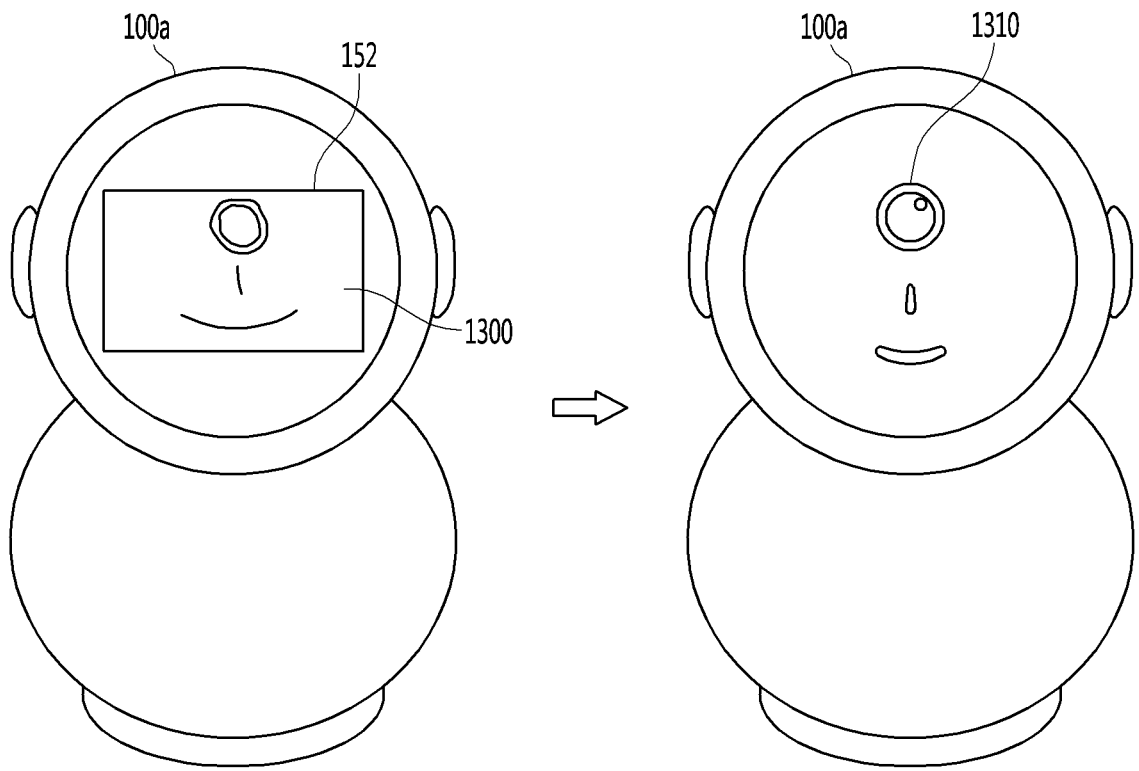

In this regard, referring to FIG. 13, the processor 180 may acquire drawing data 1300 including partial drawing images corresponding to mouth, nose, and one eye.

The processor 180 may recognize each of face parts based on the drawing data 1300. When recognizing only one eye according to the recognition result, the processor 180 may generate and provide a face design 1310 including one eye, and thus may generate a face design to which user intention is accurately applied.

That is, according to the embodiments shown in FIGS. 7 to 13, the robot 100a may generate a face design using drawing data drawn by the user, and thus may provide a unique robot face design and various emotion expressions based thereon for the user only. Accordingly, the user may use a robot face design according to preference, thereby enhancing satisfaction and a frequency of usage of the robot 100a.

Figure 14:
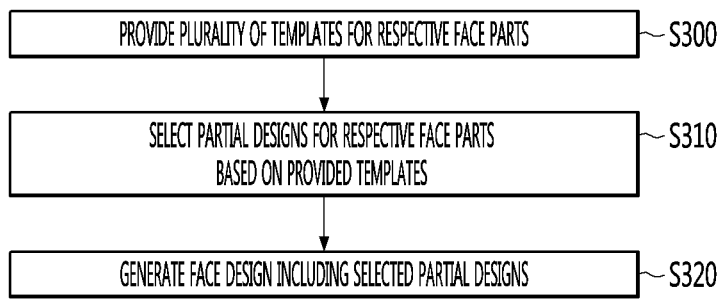
FIG. 14 is a flowchart showing an embodiment related to an operation of generating a face design of the robot illustrated in FIG. 6.
Figure 15:
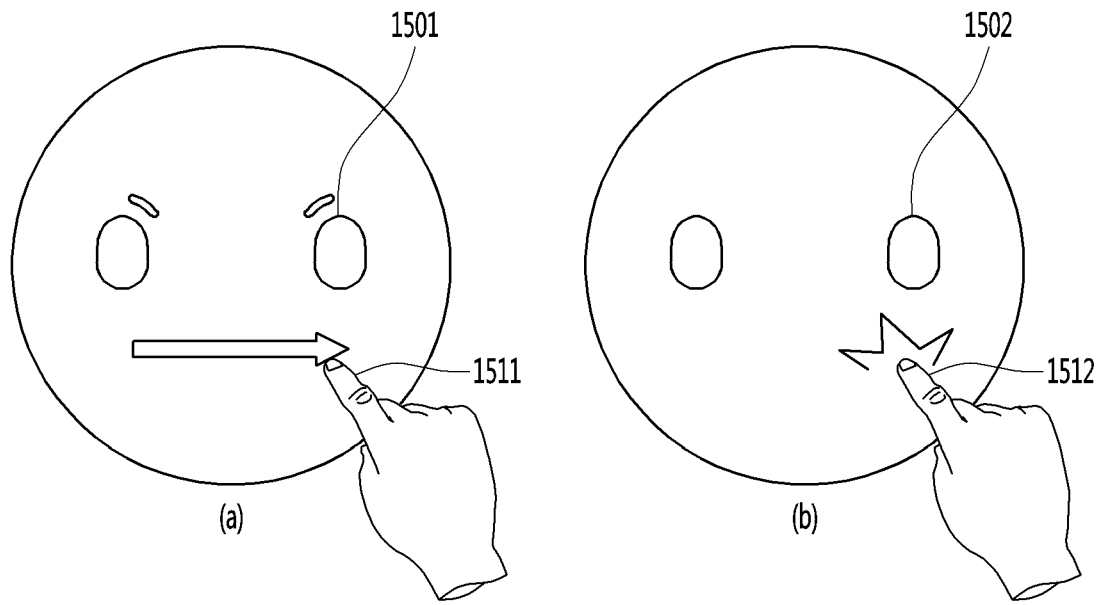
FIGS. 15 to 17 are diagrams showing the embodiment shown in FIG. 14.
Figure 16:
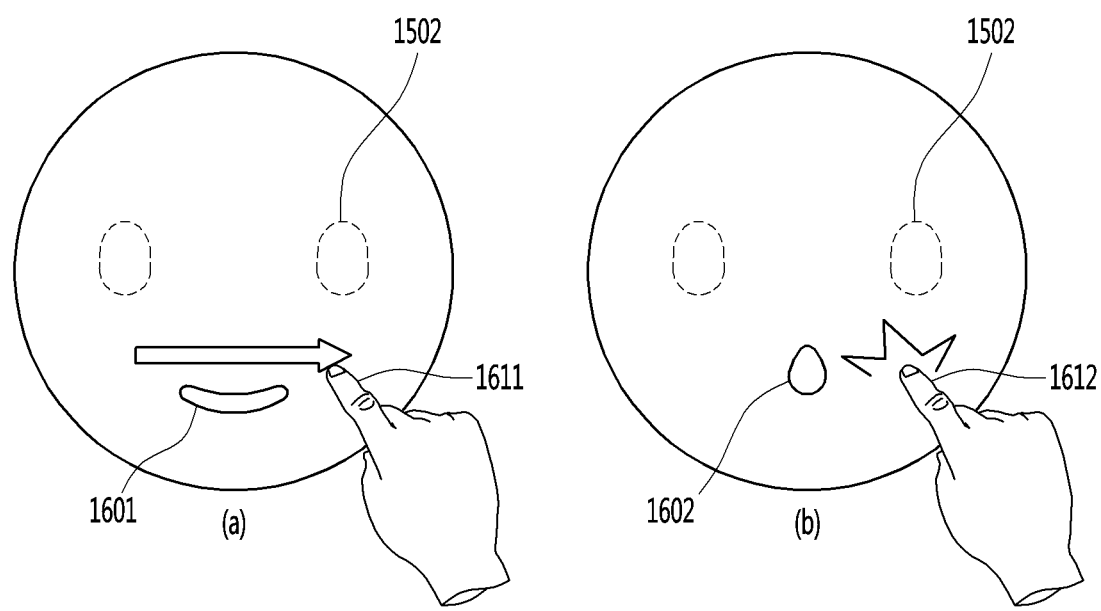
Figure 17:
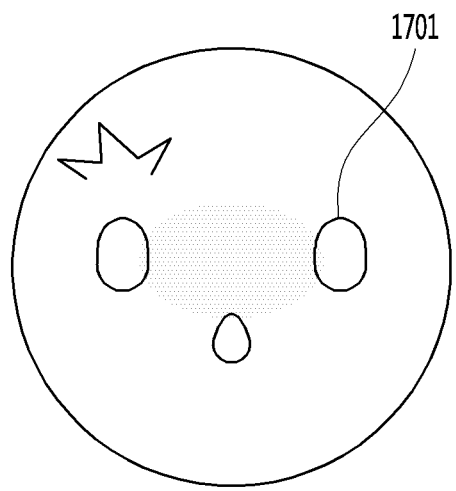
Figure 17:
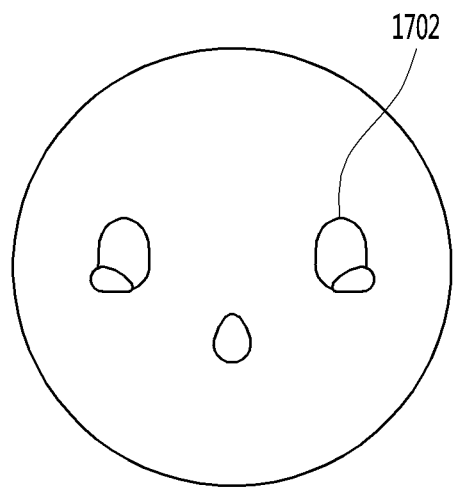
Figure 17:
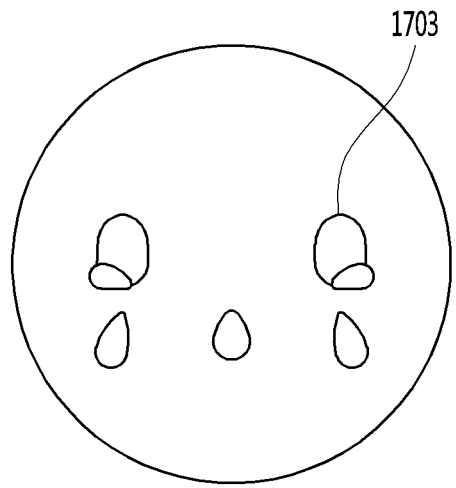
Figure 17:
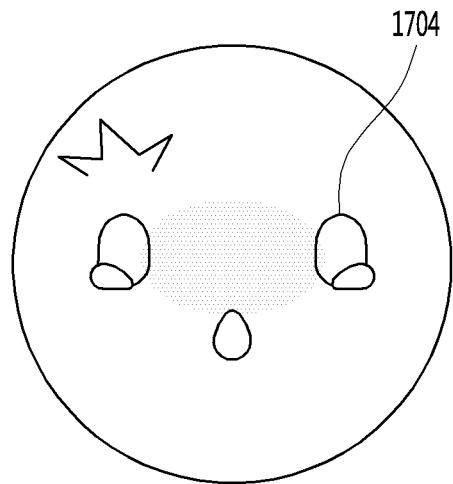

FIG. 14 is a flowchart showing an embodiment related to an operation of generating a face design of the robot illustrated in FIG. 6. FIGS. 15 to 17 are diagrams showing the embodiment shown in FIG. 14.

Referring to FIG. 14, the robot 100a may provide a plurality of templates of each of face parts in response to a customizing request (S300). The robot 100a may receive input of selecting partial designs of the respective face parts based on the provided templates (S310).

The respective templates may correspond to different partial designs (images) for a specific face part.

For example, the processor 180 may display a template selection interface for enabling the user to sequentially select partial designs for respective face parts, and may set the partial designs based on the displayed template selection interface.

In this regard, referring to FIGS. 15 and 16, the processor 180 may display an image for setting a partial design of a first face part (e.g., eye) among face parts.

Referring to FIGS. 15A and 15B, the processor 180 may display a first template 1501 of a first face part (eye) through the display 152.

The user may check a design of the displayed first template 1501. For example, in order to check another template that is not the first template 1501, the user may input a request for output of another template. For example, the input may correspond to swipe touch input 1511 of an arbitrary position of the display 152, but the present invention is not limited thereto.

The processor 180 may display a second template 1502 through the display 152 in response to the request for output of another template.

The user may check a design of the displayed second template 1502. For example, in order to select a design of the second template 1502 as a partial design of the first face part (eye), the user may input a request for selection of the second template 1502. For example, the input may correspond to short touch input 1512 for an arbitrary position of the display 152, but the present invention is not limited thereto.

The processor 180 may set the design of the second template 1502 to a partial design of the first face part (eye) in response to the selection request.

Referring to FIGS. 16A and 16B, after setting the partial design of a second face part (eye), the processor 180 may display a template selection interface for setting a partial design of the second face part (e.g., a mouth).

For example, the processor 180 may also display a partial design 1502 of the set first face part, and thus may enable the user to easily select a partial design of the second face part (mouth) while checking a preset first face part.

In some embodiments, the partial design 1502 of the first face part may be display to be lighter than templates 1601 and 1602 of the second face part, but the present invention is not limited thereto.

The processor 180 may display a first template 1601 of the second face part (mouth) through the display 152.

The user may check a design of the displayed first template 1601. For example, in order to check another template that is not the first template 1601, the user may input a request for output of another template. For example, the input may correspond to swipe touch input 1611 of an arbitrary position of the display 152, but the present invention is not limited thereto.

The processor 180 may display a second template 1602 through the display 152 in response to the request for output of another template.

The user may check a design of the displayed second template 1602. For example, in order to select a design of the second template 1602 as a partial design of the second face part (mouth), the user may input a request for selection of the second template 1602. For example, the input may correspond to short touch input 1612 for an arbitrary position of the display 152, but the present invention is not limited thereto.

The processor 180 may set the design of the second template 1602 to a partial design of the second face part (mouth) in response to the selection request.

In a similar manner, the processor 180 may sequentially set partial designs for a plurality of face parts.

Referring to FIGS. 15 and 16, the processor 180 may sequentially set respective partial designs of face parts through the template selection interface. However, in some embodiments, the processor 180 may also collectively set partial designs of a plurality of face parts through the template selection interface.

The robot 100a may generate a face design including the selected partial designs (S320).

The processor 180 may generate a face design to include the selected partial designs.

The processor 180 may provide a face image indicating emotion of the robot 100a based on the generated face design.

The processor 180 may set emotion to be expressed by the robot 100a based on information, data, a request, and/or a command, which are acquired through the communication unit 110, the input unit 120, and/or the sensing unit 140.

The processor 180 may correct at least some of face parts included in the face design 1100 or may add application elements, based on a type of the set emotion.

For example, when emotion of the robot 100a is surprise, the processor 180 may display a face image 1701 to which an application element corresponding to embarrassment is added, as shown in FIG. 17A.

Referring to FIGS. 17B to 17D, in a similar manner to FIG. 17A, the processor 180 may display a face image 1702 indicating that emotion of the robot 100a corresponds to worry, a face image 1703 indicating sadness, a face image 1704 indicating fear 1704, and the like.

That is, according to the embodiment shown in FIGS. 14 to 17, the robot 100a may provide a plurality of templates for respective face parts, and thus may enable the user to more easily generate a desired robot face design.

The aforementioned method of generating a face design of the robot 100a according to the embodiment shown in FIGS. 6 to 17 may be performed through a terminal 100d that is capable of communicating with the robot 100a. The terminal 100d may include a smartphone, a tablet PC, or the like. The user may generate a face design of the robot 100a through the terminal 100d, and the terminal 100d may transmit data corresponding to the generated face design to the robot 100a.

According to embodiments of the present invention, the robot may generate a face design using drawing data drawn by the user, and thus may provide a unique robot face design and various emotion expressions based thereon for the user only. Accordingly, the user may use a robot face design according to preference, thereby enhancing satisfaction and a frequency of usage of the robot.

In addition, the robot may provide a plurality of templates for respective face parts and may generate a robot face design using design of templates selected by the user, and thus may more easily generate the robot face design.

While this invention has been particularly shown and described with reference to exemplary embodiments thereof, it will be understood by those skilled in the art that various changes in form and details may be made therein without departing from the spirit and scope of the invention as defined by the appended claims.

Accordingly, the exemplary embodiments should be considered in descriptive sense only and not for purposes of limitation.

The scope of the invention is defined not by the detailed description of the invention but by the appended claims, and all differences within the scope will be construed as being included in the present invention.

What is claimed is:

1. A robot comprising:
   a display configured to display a face image indicating a face of the robot;
   an input unit configured to receive a customizing request for the face of the robot; and
   a processor configured to acquire customizing data based on the received customizing request, to generate a face design based on the acquired customizing data, and to control the display to display a face image based on the generated face design,
   wherein the processor is configured to:
      display a template selection interface configured to select a partial design for each of face parts in response to the received customizing request,
      acquire at least one partial design selected according to the displayed template selection interface as the customizing data, and
      generate the face design including the at least one partial design.

2. The robot of claim 1, wherein the input unit includes a touchscreen, and
   wherein the processor displays a drawing interface through the display in response to the received customizing request, and acquires drawing data corresponding to touch input of a user as the customizing data through the displayed drawing interface and the input unit.

3. The robot of claim 2, wherein the processor corrects the drawing data to generate the face design.

4. The robot of claim 3, wherein the processor generates a plurality of face design candidates by correcting the drawing data, and upon selecting any one among the plurality of generated face design candidates, the processor generates the selected face design candidate as the face design.

5. The robot of claim 2, wherein the drawing data includes partial drawing image for each respective at least one face part.

6. The robot of claim 5, wherein the processor recognizes a face part of each of the at least one partial drawing image, and generates the face design from the drawing data based on the recognized face part.

7. The robot of claim 6, wherein the processor recognizes a face part of each of the at least one partial drawing image based on at least one of a shape, a size, an absolute position, or a positional relationship of each of the at least one partial drawing image.

8. The robot of claim 6, wherein the processor recognizes a face part of each of the at least one partial drawing image from the drawing data through a learning model trained by a learning processor.

9. The robot of claim 1, wherein the processor acquires a request for selection of any one of a plurality of templates for a first face part, through the input unit, and sets a design of the selected template to a partial design of the first face part.

10. The robot of claim 9, wherein the processor acquires a request for selection of any one of a plurality of templates for a second face part, through the input unit, and sets a design of the selected template to a partial design of the second face part.

11. The robot of claim 1, wherein the processor sets emotion to be expressed by the robot based on at least one of information, data, a request, or a command, which is acquired at least one of the input unit, a sensing unit including at least one sensor, or a communication unit, and displays the face image through the display based on the set emotion.

12. The robot of claim 11, wherein the processor generates the face image obtained by correcting at least some of face parts included in the face design, based on the set emotion.

13. A method of controlling a robot, the method comprising:
   receiving a customizing request for a face of the robot;
   acquiring customizing data based on the received customizing request;
   generating a face design based on the acquired customizing data; and
   displaying a face image based on the generated face design,
   wherein the acquiring the customizing data includes:
      displaying a template selection interface configured to select a partial design for each of face parts in response to the received customizing request; and
      acquiring at least one partial design selected according to the displayed template selection interface as the customizing data.

14. The method of claim 13, wherein the acquiring the customizing data includes:
   displaying a drawing interface through a display in response to the received customizing request; and
   acquiring drawing data corresponding to touch input as the customizing data through the display based on the displayed drawing interface.

15. The method of claim 14, wherein the generating the face design includes correcting the acquired drawing data to generate the face design.

16. The method of claim 14, wherein the drawing data includes partial drawing image for each respective at least one face part; and
   wherein the generating the face design includes, recognizing a face part of each of the at least one partial drawing image based on at least one of a shape, a size, an absolute position, or a positional relationship of each of the at least one partial drawing image, and generating the face design from the drawing data based on the recognized face part.

17. The method of claim 13, wherein the displaying the face image includes:
   setting emotion to be expressed by the robot based on at least one of information, data, a request, or a command, which is acquired at least one of an input unit, at least one sensor, or a communication unit; and displaying the face image obtained by correcting at least some of face parts included in the face design, based on the set emotion.

\* \* \* \* \*